United States Patent

Sheu

[11] Patent Number: 5,834,126
[45] Date of Patent: Nov. 10, 1998

[54] BARRIER LAYER FOR USE IN REFRIGERATOR CABINETS

[75] Inventor: Hrong-Roang Sheu, Wyandotte, Mich.

[73] Assignee: BASF Corporation, Mount Olive, N.J.

[21] Appl. No.: 477,972

[22] Filed: Jun. 7, 1995

Related U.S. Application Data

[62] Division of Ser. No. 366,711, Dec. 30, 1994.

[51] Int. Cl.⁶ .................................................... B32B 27/08
[52] U.S. Cl. .......................... 428/515; 428/516; 428/518; 428/519; 428/520
[58] Field of Search .................................... 428/516, 518, 428/519, 515, 520

[56] References Cited

U.S. PATENT DOCUMENTS

| | | | |
|---|---|---|---|
| 3,960,631 | 6/1976 | Weiss et al. | 156/244.11 |
| 4,005,919 | 2/1977 | Hoge et al. | 312/406 |
| 4,031,166 | 6/1977 | Bronstert et al. | 525/98 |
| 4,394,485 | 7/1983 | Adur | 525/74 |
| 4,707,401 | 11/1987 | Benford | 428/317.5 |
| 5,118,174 | 6/1992 | Benford et al. | 312/406 |
| 5,219,665 | 6/1993 | Chen et al. | 428/515 |
| 5,221,136 | 6/1993 | Hauck et al. | 312/406 |
| 5,227,245 | 7/1993 | Brands et al. | 428/483 |
| 5,264,280 | 11/1993 | Chundury et al. | 428/330 |
| 5,290,837 | 3/1994 | Ghidoni | 524/126 |
| 5,340,208 | 8/1994 | Hauck et al. | 312/406 |
| 5,374,680 | 12/1994 | Chundury | 525/71 |
| 5,532,315 | 7/1996 | Bonekamp et al. | 525/71 |

FOREIGN PATENT DOCUMENTS

| | | |
|---|---|---|
| 995388 | 8/1976 | Canada . |
| 563956 | 10/1993 | European Pat. Off. . |
| 563956A2A3 | 10/1993 | European Pat. Off. . |
| 2176025 | 10/1973 | France . |

OTHER PUBLICATIONS

PCT International Search Report dated Apr. 29, 1996.
Chemical Abstract, JP A 54057582, vol. 91.
Chemical Abstract and Derwent Abstract of JP54047482 (Asahi).

*Primary Examiner*—Leszek Kilman
*Attorney, Agent, or Firm*—James J. Drake

[57] ABSTRACT

Disclosed herein is a composition for barrier layers for use in insulative cabinet wall structures, particularly those used in appliances such as refrigerators and dishwashers. The compositions of the barrier layer is resistant to the action of polyurethane foam blowing agents, and has (i) an effective amount of a polyethylene modified with a compound such as maleic anhydride, maleic acid, maleic anhydride derivatives, maleic acid derivatives, or mixtures thereof; and (ii) an effective amount of a rubber.

The barrier layer composition may contain polyethylene, polypropylene, polybutylene, or copolymers thereof.

16 Claims, 1 Drawing Sheet

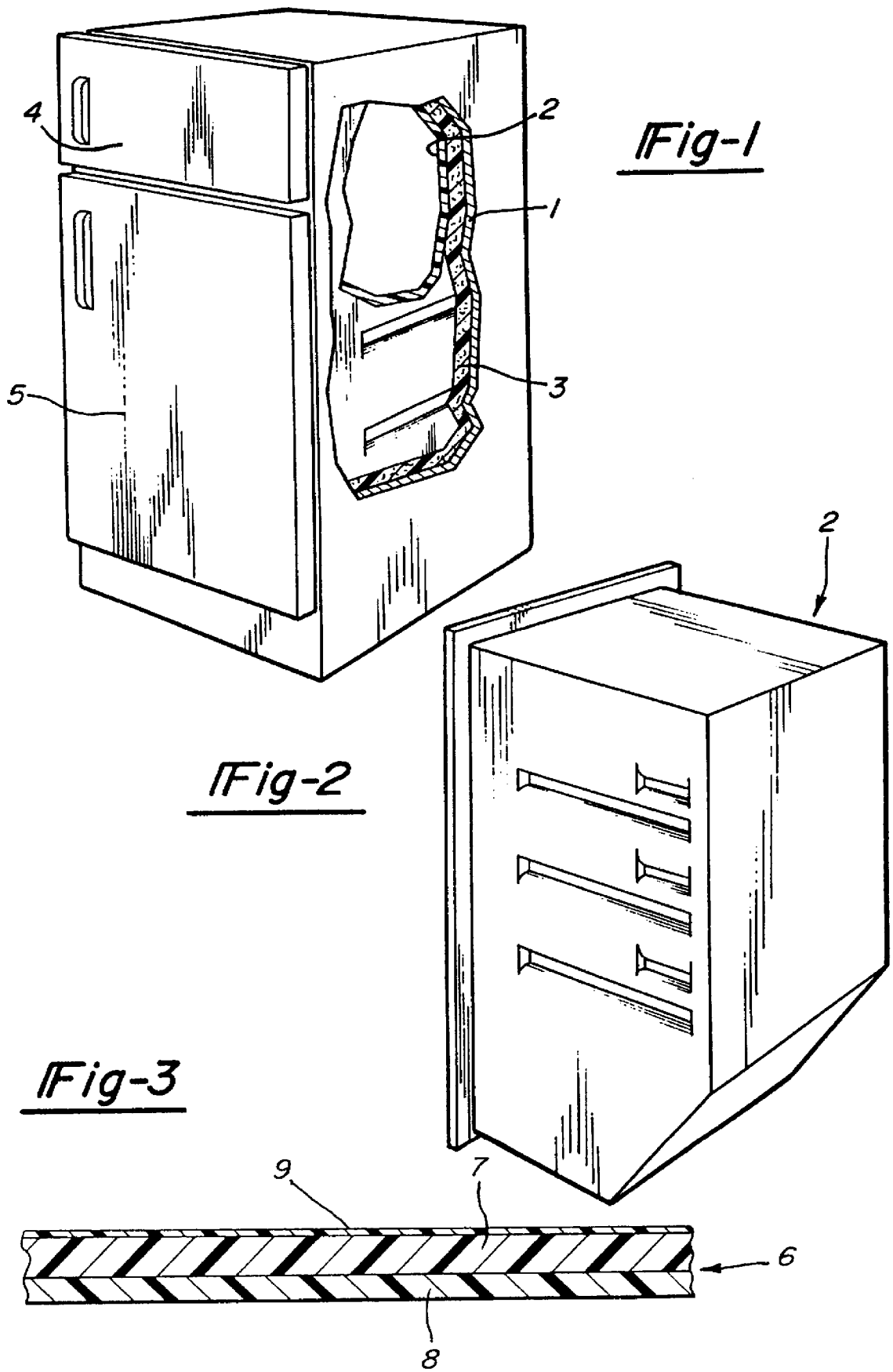

BARRIER LAYER FOR USE IN REFRIGERATOR CABINETS

This is a division of application Ser. No. 08/366,711 filed Dec. 30, 1994, pending.

BACKGROUND OF INVENTION

The invention provides compositions which are resistant to the action of polyurethane foam blowing agents, barrier layers comprised of said compositions, thermoformable composites incorporating said barrier layers, methods of making said thermoformable composites, and insulative cabinet wall structures incorporating said thermoformable composites, the structures being useful in appliance constructions, particularly refrigerators and dishwashers.

Typical refrigerator appliance cabinets consist of an outer metal cabinet, an inner plastic liner typically made of ABS (acrylonitrile-butadiene-styrene) or HIPS (high impact polystyrene), and an insulating foam core, generally of polyurethane foam. Blowing agents for the polyurethane foam are locked into the foam. Freon or fluorotrichloromethane (CFC-11), a completely halogenated methane, is presently employed commercially as the blowing agent. However, increasing amounts of environmental regulations are urging, and in some cases mandating, that substitutes for Freon be found. The most promising proposed substitutes for Freon are halogenated hydrocarbons containing at least one hydrogen atom.

Polyurethane blowing agents, such as Freon and Freon substitutes like 2-fluoro-2,2-dichloroethane and 2,2-dichloro-1,1,1-trifluoroethane (HCFC 141b and HCFC 123, respectively), can cause liner blistering, catastrophic cracks, tiny cracks (crazing), and loss of impact properties (embrittlement), as well as stress whitening and/or dissolution. Freon substitutes such as HCFC 141b and HCFC 123 appear to be more chemically aggressive than Freon in attacking the liner. It is commonly believed that blowing agent attack of the liner occurs on cooling and condensation of the blowing agent to liquid. Conditions favorable to such cycles occur during shipping and storage. Shipping conditions can be simulated during fabrication by cycling the appliance cabinet from hot to cold to cause evaporation and condensation of the blowing agent(s).

Prior art attempts to address this problem have involved the use of barrier layers. A principal function of such layers is to impede the attack of the blowing agents upon the inner plastic liner. However, in addition to providing superior solvent resistant with respect to polyurethane foam blowing agents, barrier layer compositions must also exhibit certain 'processability' characteristics. In particular, compositions intended for use as barrier layers in appliance cabinet construction must be extrudable, thermoformable and regrindable.

Extrudablity, as used herein, is intended to indicate that the composition can be extruded, either simultaneously or subsequently, with the materials which comprise the inner plastic liner or liners to form a thermoplastic composite. Thus, the composition of the barrier layer must be adherable to the styrene based polymers commonly used to make the inner plastic liner. Illustrative examples of styrene based polymers are ABS, HIPS, and mixtures thereof. The ability to co-extrude the barrier layer with the one or more layers of the inner liner provide significant cost and efficiency advantages.

In addition, barrier layer compositions must be thermoformable. In particular, the barrier layer composition must not detract from the thermoformability of composite structures incorporating such barrier layers. If the resulting composites cannot be thermoformed into the required inner cabinet shape, appliance cabinet manufacturers lose significant cost and production advantages. Those skilled in the art will appreciate that thermoformability is thus a requisite for compositions intended for use as barrier layers in appliance cabinet construction.

Finally, the barrier layer composition must not negatively affect the regrindability or recyclability of the thermoformable composite. During the manufacturing of appliance cabinets, the thermoformed inner cabinets are typically trimmed of excess composite material. The resulting trim or scrap material is often incorporated into virgin inner liner material, ie., styrene based polymer(s). As a result, compatibility of the composition of the barrier layer with that of the inner liner materials is particularly important. The properties of the inner liner materials must not be negatively affected. Those skilled in the art will appreciate that the ability to recycle excess thermoformable composite material provides significant cost savings.

Thus, it would be highly desirable to provide a barrier layer composition capable of exhibiting (a) superior solvent resistant to polyurethane foam blowing agents, (b) extrudability and adherability with respect to inner liners and the manufacture of composite structures, (c) thermoformability once the barrier layer has been incorporated into a composite structure, and (d) regrindability with respect to the incorporation of scrap material in virgin liner material.

Although several attempts have been made by the prior art to address this problem, none have provided the desired balance of properties.

For example, U.S. Pat. No. 5,118,174 to Benford et al discloses a multi-component laminated structure for use insulated appliance cabinet structures. The multi-component laminated structure contains a barrier layer (40) disclosed to be a film of EVOH, ceramic, nylon, PET, PDT, etc. However, this barrier layer provides insufficient solvent resistance and regrind capability.

U.S. Pat. No. 5,227,245 to Brands et al discloses a barrier layer for preventing solvent attack in insulative cabinet wall structures which consists essentially of amorphous thermoplastic polyester resin which is a copolymer adduct of an aromatic dicarboxylic acid and an active hydrogen containing material. However, the polyester has extremely poor compatibility with styrenic resins and thus the barrier layer lacks the desired regrind capability.

Finally, U.S. Pat. Nos. 5,221,136 and 5,340,208 to Hauck et al, disclose a barrier layer comprised of a polyolefin and a block copolymer rubber which may be functionalized with maleic anhydride. However, some thermoformable composites prepared using these barrier layers have been found to exhibit less than optimum thermoformablity. Particularly, it has been found that the barrier layer can stick to the female molds employed in the thermoforming process. In addition, such barrier layer compositions have been found to have limited regrind capability with styrenic based inner liner materials.

Thus, it is an object of this invention to provide a barrier layer composition which is resistant to the action of polyurethane foam blowing agents, and which exhibits desirable processing characteristics such as extrudability, thermoformability, and regrindability.

It is another object of the invention to provide a barrier layer which is adherable to one or more inner liner layers to form a thermoformable composite.

More particularly, it is an object of the invention to provide a barrier layer which is extrudable with one or more inner liner layers to form a thermoformable composite.

It is another object of the invention to provide a thermoformable composite which contains a barrier layer which protects one or more inner liner layers from the action of polyurethane foam blowing agents, and which furthermore has desirable regrind compatibility with the materials comprising said inner liner layers.

Finally, it is an object of the invention to provide an insulated cabinet wall structure which comprises a thermoformable composite which contains a barrier layer protecting the innerliner layers from the action of polyurethane foam blowing agents.

SUMMARY OF THE INVENTION

These and other objects of the invention are provided with a particular barrier layer composition. The barrier layer composition is resistant to the action of polyurethane foam blowing agents and comprises (i) an effective amount of a modified polyolefin, most preferably modified with a compound selected from the group consisting of maleic anhydride, maleic acid, maleic anhydride derivatives, maleic acid derivatives, and mixtures thereof; and (ii) an effective amount of a rubber. Optionally, and most preferably, the barrier layer composition will further contain an effective amount of a polyolefin (iii), selected from the group consisting of polyethylene, polypropylene, polybutylene, and copolymers thereof.

The invention further provides a thermoformable composite having a functional layer (I) comprising one or more sublayers of one or more styrenic based polymers, and a barrier layer (II) adhered to at least one surface of the functional layer (I), wherein the barrier layer (II) comprises (i) an effective amount of a modified polyolefin, and (ii) an effective amount of a rubber. Most preferably, the barrier layer (II) will further contain (iii) an effective amount of a polyolefin selected from the group consisting of polyethylene, polypropylene, polybutylene and copolymers thereof.

The invention also provides an insulative wall cabinet structure having the thermformable composite disclosed above in combination with an outer structural wall (III) and polyurethane foam insulation (IV) adhered to both of the barrier layer (II) and the outer structural wall (III) so as to be placed there between.

Finally, the invention provides a method of making a thermoformable composite, requiring providing a functional layer (I) having one or more sublayers of one or more styrenic based polymers and adhering to the functional layer (I), a barrier layer (II) having the composition disclosed above.

DESCRIPTION OF THE DRAWINGS

FIG. 1 is a schematic drawing of a refrigerator cabinet.

FIG. 2 is a schematic drawing of an inner cabinet serving as the inner plastic wall of the refrigerator of FIG. 1.

FIG. 3 is a fragmentary cross-section of the thermformable composite forming the inner cabinet of FIG. 2.

DETAILED DESCRIPTION OF THE INVENTION

Turning now to the drawings, it can be seen that FIG. 1 illustrates a particularly desirable end use application for the instant invention. The refrigerator appliance 4 has an insulative wall cabinet structure 6 which is comprised of an outer metal shell 8, inner cabinet 10, and a body of foamed-in-place insulation 12 there between. Inner cabinet 10 is formed of thermoformable composite 14.

Turning now to FIG. 3, thermoformable composite 14 is comprised of a functional layer 16 and a barrier layer 18.

Functional layer 16 serves as the visually pleasing portion of the interior of the refrigerator appliance 4. In general, the functional layer 16 will be comprised of one or more sublayers of one or more styrenic based polymers. Suitable examples of styrenic based polymers include ABS, HIPS and mixtures thereof.

A particularly preferred example is illustrated in FIG. 3, wherein functional layer 16 is comprised of sublayers 20 and 22. In general, sublayer 20 will generally provide a visually pleasing high gloss appearance, while sublayer 22 will generally provide desirable performance characteristics such as good resistance to food contamination and normal wear and tear. Illustrative materials particularly suitable for use as sublayer 20 include HIPS. A particularly desirable material for use as sublayer 20 is PS-7800, commercially available from BASF Corporation of Wyandotte, Mich.

Illustrative materials suitable for use as sublayer 22 include bulk HIPS or ABS. A particularly desirable material is PS-7100, also commercially available from BASF Corporation.

In general, sublayers 20 and 22 will comprise functional layer 16. However, it will be appreciated that with the many polymer compositions now available, functional layer 16 may also be comprised of either a single layer or more than two layers.

In the particularly preferred embodiment described above, sublayer 20 will generally comprise from between 1 to 10 percent by weight of the overall weight of functional layer 16 while sublayer 22 will generally comprise between 99 to 90 percent by weight of the overall weight of functional layer 16. More particularly, sublayer 20 comprises from between 1 to 5 percent by weight while sublayer 22 comprises from between 99 to 95 percent of the total weight of functional layer 16.

The barrier layer 18 will be comprised of:

(i) an effective amount of a modified polyolefin; and (ii) an effective amount of a rubber.

Optionally, and most preferably, the composition comprising barrier layer 18 may further include a polyolefin (iii) selected from the group consisting of polyethylene, polypropylene, polybutylene, and copolymers thereof. The composition may also optionally contain a styrenic based polymer (iv).

The composition comprising barrier layer 18 will contain a modified polyolefin (i). As used herein, the term modified polyolefin is intended to describe polyolefin graft co-polymers derived from the graft polymerization of an unsaturated carboxylic acid or its functional derivative or another vinyl functional group containing monomer onto any of the olefin polymers discussed below with respect to component (iii). However, the olefin to be so modified will preferably be polyethylene (HDPE, LDPE, LLDPE).

The unsaturated carboxylic acid or its functional derivative or another vinyl functional group containing monomer which is to be grafted onto the above-mentioned olef in polymers, includes, for example, carboxylic acids such as acrylic acid, methacrylic acid, maleic acid, fumaric, itaconic and sorbic acid; acid anhydrides such as maleic anhydride and itaconic anhydride; acid amides such as acrylamide and methacrylamide; epoxy group containing compounds such as glycidyl acrylate, glycidyl methacrylate; hydroxyethyl group containing esters such as 2-hydroxyethyl methacrylate and polyethylene glycol monoacrylate; and metal salts such as sodium acrylate, sodium methacrylate and zinc acrylate. These graft monomers may be used alone or in combination. Among the acids and anhydrides that are particularly preferred are maleic anhydride and maleic acid and the derivatives thereof.

The proportion of said graft monomers are preferably within the molar range of 0.005 to 5 percent. A preferred embodiment of such polymer type includes the product obtained or anhydride maleic acid or anhydride onto an HDPE. The graft copolymerization of the unsaturated carboxylic acid or its functional derivative or another vinyl functional group containing monomer onto the olefin polymer can be conducted using various method. For example, the olefin polymer, the graft monomer and a free-radical initiator are mixed together and kneaded in a molten state. In another method, the graft monomer are incorporated in a solution or suspension of the olefin polymer in a suitable solvent.

A most preferred material for use as modified polyolefin (i) is Plexar PX209, commercially available from Quantum of Cincinnati, Ohio.

The composition comprising barrier layer 18 will further comprise a rubber (ii). Suitable rubbers will generally be synthetic block copolymer rubbers. Illustrative examples include styrene block diblock, styrene-ethylene/butylene-styrene triblock, styrene-ethylene/butylene-styrene triblock functionalized with maleic anhydride, maleic acid or admixtures thereof, or combinations of any of the above. Particularly suitable rubbers (ii) are Stereon 840A, commercially available from Firestone Tire & Rubber Co., and Finaclear 520, commercially available from Fina of Houston, Tex.

Optionally, and most preferably, the composition of the invention will also contain a polyolefin (iii). Although the composition containing components (i) and (ii) is capable of providing desirable performance properties, the incorporation of polyolefin (iii) provides significant cost advantages without any significant decrease in the performance or processing properties of the compositions or barrier layers of the invention.

Broadly speaking, the polyolefin component (iii) is defined to include the various types of polyethylene and polypropylenes, polybutylenes, and the well-known copolymers thereof. While the polyolefins other than polyethylene can provide blends in accordance with the present invention, it is the polyethylenes which are the preferred group. Included in the polyethylenes are the HDPE materials made by polymerizing ethylene using so-called Ziegler-Natta coordination catalysts to provide linear (non-branched) high density polyethylene (densities=0.941 to 0.965 gms/cc); LDPE materials made by polymerizing ethylene using free-radical catalysts under high pressures and high temperatures to provided branched polyethylenes (densities=0.910 to 0.934 gms/cc); the LLDPE materials prepared from ethylene and minor amounts of alpha, beta-ethylenically unsaturated $C_3$ to $C_{12}$ alkenes under Ziegler-Natta conditions to provide essentially linear low density polyethylenes but with alkyl side chains from the α-olefin components (densities=0.88 to 0.935 gms/cc). Preferred within this polyethylene group are the high density polyethylenes as described above.

In addition, suitable polyolefins (iii) will also have melt flow indexes (MFI) of between 1 to 10, with the most preferred polyolefins having MFI's of between 1 to 3. A particularly preferred polyolefin is the high density polyethylene commercially available as LM-6187 HDPE from Quantum of Cincinnati, Ohio.

Finally, the composition comprising barrier layer 18 may further optionally contain a styrenic based polymer (iv). The styrenic polymer component (iv) of the present invention is a polystyrene resin or ABS (acrylonitrile-butadiene-styrene) copolymer. The polystyrene resins includes styrene homopolymer (crystal polystyrene), or rubber modified polystyrene (high impact polystyrene (HIPS)). The polystyree is a high molecular weight polymer, preferably, having a molecular weight (weight average) greater than about 150,000 g/mol. Rubber modified polystyrene, which is most preferred, is a well-known material which is polystyrene modified by an elastomer such as polybutadiene or styrene-butadiene copolymer. This material is described, for example, in Modern Plastics Encyclopedia, McGraw-Hill, p.72 (1983–1984). It can be prepared by polymerizing styrene monomer in the presence of polybutadiene or styrene-butadiene copolymer. The ABS copolymer resins that can be used in the present invention are well known to those skilled in the art, the preparation of such material is disclosed in, for example, U.S. Pat. Nos. 3,563,845; 3,565,746; and 3,509,237 all of which are incorporated herein by reference.

In general, the composition comprising barrier layer 18 generally may have from 0 to 90 weight percent of polyolefin (iii), 1 to 70 weight percent of modified polyolefin (i), 1 to 40 weight percent of rubber (ii), and from 0 to 50 weight percent of styrenic based polymer (iv), wherein all parts by weight are based on the total weight of the barrier layer composition.

A preferred barrier layer composition will have from between 20 to 80 percent polyolefin (iii), 5 to 40 weight percent modified polyolefin (i), 5 to 30 weight percent rubber (ii), and from 0 to 40 weight percent of styrenic based polymer (iv).

Most preferably, the barrier layer composition of the invention will have from between 30 to 70 weight percent of polyolefin (iii), 5 to 30 weight percent of modified polyolefin in (i), 5 to 20 weight percent of rubber (ii), and from 0 to 30 weight percent of styrenic based polymer (iv).

Two particularly preferred embodiments of the barrier layer composition of the invention are set forth below:

|  | EMBODIMENT #1 (pbw) | EMBODIMENT #2 (pbw) |
| --- | --- | --- |
| Polyolefin (iii) | 60–70 | 35–45 |
| modified polyolefin (i) | 15–25 | 15–25 |
| Rubber (ii) | 10–20 | 10–20 |
| Styrene polymer (iv) | — | 20–40 |

Components (i)–(iv) of the barrier layer composition will be processed by well-known processing methods so as to form a homogeneous mixture. The mixture may be pelletized as necessary or may be immediately formed into a layer by well-known polymer processing techniques.

Turning now to thermoformable composite 14, barrier layer 18 will normally be from 1 to 50 percent by weight of the total weight of composite 14, while functional layer 16 will be from 50 to 99 percent by weight, based on the weight of composite 14. More particularly, functional layer 16 and barrier layer 18 will respectively comprise 70 to 99 percent by weight and 30 to 1 percent by weight of the overall weight of composite 14. It is most preferred if composite 14 has from 80 to 95 percent functional layer 16 and 5 to 20 percent by weight of barrier layer 18.

More preferably, thermoformable composite 14 will be formed by the simultaneous coextrusion of barrier layer 18 directly onto sublayer 22. In this preferred embodiment, sublayer 22 will be coextensive with and adhered to sublayer 20. Alternatively, a previously made barrier layer or sheet 18 may be subsequently laminated to functional layer 16 and more preferably, to sublayer 22. Those skilled in the art will appreciate that well-known lamination technologies involving the application of increased heat and/or pressure are sufficient to form thermoformable composite 14.

Thermoformable composite 14 will generally be thermoformed into an appliance cabinet structure such as that illustrated in FIG. 2 as inner cabinet 10. Those skilled in the art will appreciated that such processing techniques are well-known in the art and generally involve a stamping process utilizing cooperating male and female molds. It will be appreciated that at most molding operations, a surface of barrier 18 will face outward, away from the interior of inner cabinet 10 and thus will be in contact with the female mold. Accordingly, it is an aspect of desirable thermoformability that barrier layer 18 not adhere to the female mold during the thermoforming process.

Thermoformed inner cabinet 10 is then assembled with outer shell 8 so that a gap exists there between. A polyurethane foam composition is placed therein and foamed in situ between inner cabinet 10 and outer shell 8 to form foamed-in-place insulation 12. The resulting structure of inner cabinet 10, outer shell 8 and foamed-in-place insulation 12 there between is herein defined to be insulative wall cabinet structure 6.

The outer shell 8 may be comprised of well known materials suitable for use as the outer surface of an appliance construction. While hard rigid plastics may be suitable, metal is most preferred.

In the present invention, the preferred foamed-in-place insulation 12 is polyurethane foam. Polyurethane foam can be prepared by mixing intimately under reaction conditions an organic polyisocyanate with an isocyanate reactive, active hydrogen-containing compound such as, for example, a polyol in the presence of a blowing agent and introducing the foam-forming mixture into the space between the inner cabinet 10 and outer metal shell 8 of the cabinet.

Blowing agents employed in the preparation of the polyurethane are generally organic compounds having an atmospheric boiling point of from about −50° C. to about +100° C. Generally, such compounds selected for this purpose are halogenated organic compounds especially those containing fluorine and or chlorine as this additionally helps confers good thermal insulation properties to the foam.

In the present invention, the preferred blowing agent for use in preparing the polyurethane foam 12 are those comprising a hydrohalocarbon. Hydrohalocarbons are preferred over perhalogenated carbon compounds due to their generally lower ozone depleting potentials, though the use of perhalogenated carbon compounds such as trichlorofluoromethane and dichlorodifluoromethane in small amounts is not precluded from the present invention.

Suitable hydrohalocarbon compounds include hydrochlorofluorocarbons, hydrofluorocarbons and hydrochlorocarbons, particularly those which are $C_{1-3}$ compounds due to their suitable boiling points.

Preferred blowing agents for preparing the insulative polyurethane foam used in the present invention include HCFC-123, HCFC-141b, HCFC-142b, HCFC-134 and HCFC-134a and 1,1,1-trichloroethane due to availability, ease of handling and the desirable physical properties of polyurethane foams prepared therewith. However, those skilled in the art will appreciate that the use of other polyurethane foam blowing agents is within the scope of the instant invention.

The blowing agent is employed in quantities sufficient to provide for a foam having an overall bulk density of from about 10 to about 200, preferably about 15 to about 100, and more preferably about 18 to about 60 kg/m$^3$.

Active hydrogen-containing compounds which are useful in the preparation of the polyurethane foam include those materials having two or more groups which contain an active hydrogen atoms which can react with an isocyanate. Collectively, such compounds are referred to as polyahls. Preferred among such polyahl compounds are those having at least two hydroxyl, primary or secondary amine, carboxylic acid, or thiol groups per molecule. Polyols, i.e., compounds having at least two hydroxyl groups per molecule, are especially preferred due to their desirable reactivity with polyisocyanates.

Suitable isocyanate reactive materials for preparing rigid polyurethanes include those having an equivalent weight of about 50 to about 700, preferably about 70 to about 300 and more preferably about 70 to about 150. Such isocyanate-reactive materials also advantageously have a functionality of at least 2, preferably about 3, up to about 16, preferably up to about 8, active hydrogen atoms per molecule.

Suitable additional isocyanate-reactive materials include polyether polyols, polyester polyols, polyhydroxyl-terminated acetal resins, hydroxyl-terminated amines and polyamines, and the like. Most preferred for preparing rigid foams, on the basis of performance, availability and cost, is a polyether polyol prepared by adding an alkylene oxide to an initiator having from about 2 to about 8, preferably about 3 to about 8 active hydrogen atoms.

Polyisocyanates useful in making polyurethanes include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,5-diisocyanate, tetramethylene-1,4-diisocyanate, cyclohexane-1,4-diisocyanate, hexahydrotoluene diisocyanate (and isomers), naphthalene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5',5'-tetraisocyanate and the diverse polymethylenepolyphenylpolyisocyanates.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine.

Especially preferred are methylene-bridged polyphenylpolyisocyanates, due to their ability to crosslink the polyurethane. The isocyanate index (ratio of equivalents of isocyanate to equivalents of active hydrogen-containing groups) is advantageously from about 0.9 to about 5.0, preferably about 0.9 to about 3.0, more preferably about 1.0 to about 1.5.

In addition to the foregoing critical components, it is often desirable to employ certain other ingredients in preparing cellular polyurethane. Among these additional ingredients are water, catalyst, surfactant, flame retardant, preservative, colorant, antioxidants, reinforcing agent, filler, and the like.

Water is often employed in the role as a blowing agent precursor and processing aid. Water can react with isocyanate leading to the generation of carbon dioxide gas which then functions as a blowing agent in the foam-forming reaction. When present, the water is preferably used in amounts not exceeding about 7, preferably about 6, more preferably about 5 parts by weight per 100 parts by total weight active hydrogen-containing compound(s) present. Beneficial effects are seen when at least about 0.5 and preferably at least about 1 part of water per 100 parts total weight active hydrogen-containing compound(s) is present. Using amounts of water which exceed these ranges is possible but the resulting foam may have undesirable physical properties such as poor dimensional stability and poor thermal insulation.

In making polyurethane foam, it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, about 0.2 to about 5 parts of the surfactant per 100 parts by total weight active hydrogen-containing compound(s) present are generally sufficient for this purpose.

One or more catalysts for the reaction of the active hydrogen-containing compound(s) with the polyisocyanate are advantageously used. Any suitable urethane catalyst may be used, including tertiary amine compounds and organometallic compounds. Exemplary tertiary amine compounds include triethylenediamine, N-methyl morpholine, pentamethyldiethylenetriamine, tetramethylethylenediamine, 1-methyl-4-dimethylaminoethylpeperazine, 3-methoxy-N-diethyl-propylamine, N-ethyl morpholine, diethylethanol-amine, N-coco morpholine, N,N-dimethyl-N',N'-dimethyl isopropylpropylenediamine, N-N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate as well as other organometallic compounds. A catalyst for the trimerization of polyisocyanates, such as an alkali metal alkoxide, may also optionally be employed herein. Such catalysts are used in an amount which measurably increases the rate of reaction of the polyisocyanate. Typical amounts are about 0.001 to about 1 parts of catalyst per 100 parts by total weight of active hydrogen-containing compound(s) present.

In making a polyurethane foam, the active hydrogen-containing compound(s), polyisocyanate and other components are contacted, thoroughly mixed and permitted to react and to expand and cure into a cellular polymer. The particular mixing apparatus is not critical, and various types of mixing head and spray apparatus are conveniently used. It is often convenient, but not necessary, to pre-blend certain of the raw materials prior to reacting the polyisocyanate and active hydrogen-containing components. For example, it is often useful to blend the active hydrogen-containing compounds(s), blowing agent, surfactants, catalysts and other components except for polyisocyanates, and then contact this mixture with the polyisocyanate. Alternatively, all components can be introduced individually to the mixing zone where the polyisocyanate and polyols(s) are contacted. It is also possible to pre-react all or a portion of the active hydrogen-containing compound(s) with the polyisocyanate to form a prepolymer, although such is not preferred.

EXAMPLES

The following examples are given to illustrate the invention and should not be interpreted as limiting in any way. Unless otherwise stated, all parts and percentages are given in percent by weight.

Example 1

HCFC 141-b Blistering Study

Sheets of PS7100/protective barrier layer structures were exposed to the vapor of liquid HCFC 141-b at 35° C. by sealing sheet samples over the bottle opening. The sheet samples were prepared by compression laminating protective layer to PS7100 to have 2 mil layer on 28 mil PS7100. Barrier layers of various compositions described in Table 1 were prepared by compounding with a single screw extruder at 200° C. The effects of HCFC 141-b diffusion through the specimens was monitored for chemical attack. Time was recorded when blistering occurred and the results are set forth in Table 1. The adhesion of the protective barrier layers to PS-7100 was evaluated by a hand pull peel strength test. Adhesion test results are included in Table 1.

TABLE 1

HCFC-141B Blistering Test (HCFC-141B vapor at 35° C.)
Sheet structure:
28 mil PS7100 bulk layer
2 mil protective layer

| Samples No. | Protective Layer Composition | Protective Layer Thickness, mil | Hours to Blister | Bonding Test |
|---|---|---|---|---|
| 1 | None (30 mil PS7100 alone) | 0 | 2–3 | — |
| 2 | LM-6187 HDPE | 2 | 48–50 | Poor |
| 3 | Plexar PX209 | 2 | 150–160 | Poor |
| 4 | 85% LM-6187 HDPE 15% Stereon 840A | 2 | 16–18 | Fair |
| 5 | 85% Plexar PX209 15% Stereon 840A | 2 | 94–96 | Fair |
| 6 | 43% LM-6187 HDPE 42% PS5350 HIPS 15% Stereon 840A | 2 | 6–8 | Good |
| 7 | 43% Plexar PX209 42% PS5350 HIPS 15% Stereon 840A | 2 | 16–18 | Good |
| 8 | 43% Plexar PX209 42% PS5350 HIPS 15% FinaClear 520 | 2 | 16–18 | Good |
| 9 | 50% Plexar PX209 35% PS5350 HIPS 15% Stereon 840A | 2 | 22–26 | Good |
| 10 | 50% Plexar PX209 35% PS5350 HIPS 15% FinaClear 520 | 2 | 20–24 | Good |
| 11 | 60% Plexar PX209 25% PS5350 HIPS 15% FinaClear 520 | 2 | 18–20 | Fair |
| 12 | 40% Plexar PX209 20% LM-6187 HDPE 25% PS5350 HIPS 15% Stereon 840A | 2 | 20–22 | Fair |
| 13 | 30% Plexar PX209 30% LM-6187 HDPE 25% PS5350 HIPS 15% FinaClear 520 | 2 | 26–28 | Fair |

TABLE 1-continued

HCFC-141B Blistering Test (HCFC-141B vapor at 35° C.)
Sheet structure:
28 mil PS7100 bulk layer
2 mil protective layer

| Samples No. | Protective Layer Composition | Protective Layer Thickness, mil | Hours to Blister | Bonding Test |
|---|---|---|---|---|
| 14 | 20% Plexar PX209<br>40% LM-6187 HDPE<br>25% PS5350 HIPS<br>15% FinaClear 520 | 2 | 28–30 | Fair |
| 15 | 77% Plexar PX209<br>23% FinaClear | 2 | 54–56 | Good |
| 16 | 20% Plexar PX209<br>57% LM-6187 HDPE<br>23% FinaClear 520 | 2 | 54–56 | Good |

Materials

Plexar PX209: Quantum maleic anhydride modified HDPE. (modified polyolefin (i))

LM-6187: Quantum HDPE with d=0.96, MFI=1.15. (polyolefin (iii))

PS5350: BASF high impact polystyrene. (styrenic based polymer (iv))

Stereon 840A: Firestone S-B-S tri-block copolymer. (rubber (ii))

FinaClear 520: Fina S-B-S tri-block copolymer. (rubber (ii))

Example 2

Regrind Compatibility

The regrind compatibility of a protective layer was evaluated by testing properties of specimens injection molded from blends containing 15% of protective layer, 83.5% PS7100, and 1.5% PS7800. Results summarized in Table 2 illustrated that protective layer compositions provide excellent regrind compatibility. While the samples discussed below exhibit optimum regrindability, it is anticipated that from 0.3 percent to 3 percent additional rubber (iii) could be incorporated into the remaining samples of Table 1 to enhance their regrind compatibility.

TABLE 2

Regrind Compatibility Study Results

| | A | B | C | D | E | F | G |
|---|---|---|---|---|---|---|---|
| PS7100 | 98 | 83.5 | 83.5 | 83.5 | 83.5 | 83.5 | 83.5 |
| PS7800 | 2 | 1.5 | 1.5 | 1.5 | 1.5 | 1.5 | 1.5 |
| Sample 7 | — | 15 | — | — | — | — | — |
| Sample 8 | — | — | 15 | — | — | — | — |
| Sample 9 | — | — | — | 15 | — | — | — |
| Sample 10 | — | — | — | — | 15 | — | — |
| Sample 15 | — | — | — | — | — | 15 | — |
| Sample 16 | — | — | — | — | — | — | 15 |
| MFR (200.0° C., 5.0 kg) | 2.9 | 3.1 | 2.9 | 3.1 | 3.1 | 3.3 | 3.7 |
| Vicat (°C.) | 101 | 102 | 102 | 102 | 102 | 102 | 102 |
| Tensile Yield (psi) | 2485 | 2632 | 2689 | 2630 | 2694 | 2952 | 2946 |
| Tensile Break (psi) | 3721 | 3773 | 3945 | 3738 | 3925 | 4024 | 3960 |
| Tensile Elongation (%) | 54 | 75 | 77 | 74 | 68 | 68 | 63 |
| Tensile Modulus (Kpsi) | 181 | 179 | 176 | 169 | 176 | 177 | 175 |
| Izod Impact (ft-lbs/in) | 2.1 | 2.8 | 2.7 | 2.5 | 2.6 | 2.4 | 2.4 |
| Gardner (in-lbs) | 229 | 203 | >320 | 204 | 312 | 243 | 210 |

Materials

PS7100: BASF high impact polystyrene.

PS7800: BASF high impact polystyrene.

It should be understood that while the invention herein shown and described constitutes the preferred embodiment of the invention, it is not intended to illustrate all possible forms thereof. Various embodiments of the inventions disclosed herein can be created by one or ordinary skill in the art without departing from the spirit and scope of the invention disclosed and claimed.

I claim:

1. A thermoformable composite comprising:
   (I) a functional layer comprising at least one sublayer comprising at least one homopolymer or copolymer of styrene; and
   (II) a barrier layer adhered to at least one surface of the functional layer, the barrier layer comprising:
      (i) a polethylene graft copolymer; and
      (ii) a block copolymer rubber.

2. The thermoformable composite of claim 1 wherein the barrier layer (I) comprises:
   a first sublayer comprised of high impact polystyrene; and
   a second sublayer, adhered to the first sublayer, comprised of a material
   selected from the group consisting of high impact polystyrene acrylonitrile-butadiene-styrene and mixtures thereof,
   wherein the barrier layer (II) is adhered to the second sublayer.

3. The thermoformable composite of claim 1 comprising:
   50 to 99 pbw of the functional layer (I); and
   1 to 50 pbw of the barrier layer (II); wherein all pbw are based on the total weight of the thermoformable composite.

4. The thermoformable composite of claim 3 comprising:
   70 to 99 pbw of the functional layer (I); and
   1 to 30 pbw of the barrier layer (II); wherein all pbw are based on the total weight of the thermoformable composite.

5. The thermoformable composite of claim 4 comprising:
   80 to 95 pbw of the functional layer (I); and
   5 to 20 pbw of the barrier layer (II); wherein all pbw are based on the total weight of the thermoformable composite.

6. The thermoformable composite of claim 1 wherein the barrier layer (II) further comprises:
   (iii) a polyolefin selected from the group consisting of polyethylene, polypropylene, polybutylene and copolymers thereof.

7. The thermoformable composite of claim 1 wherein the barrier layer (II) further comprises:
   (iv) a homopolymer or copolymers of styrene.

8. The thermoformable composite of claim 1 wherein barrier layer (II) further comprises:

(i) from 1 to 70 pbw of a polyethylene graft copolymer;

(ii) from 1 to 40 pbw of a block copolymer rubber; and (iii) from 0 to 90 pbw of a polyolefin selected from the group consisting of polyethylene, polypropylene, and copolymers thereof, wherein all pbw are based on the total weight of the barrier layer (II).

9. The thermoformable composite of claim 8 wherein barrier layer (II) further comprises:

(iv) from 0 to 50 pbw of a homopolymer or copolymer of styrene.

10. The thermoformable composite of claim 8, wherein barrier layer (II) comprises:

(i) from 5 to 40 pbw of a polyethylene graft copolymer;

(ii) from 5 to 30 pbw of a block copolymer rubber;

(iii) from 20 to 80 pbw of a polyolefin selected from the group consisting of polyethylene, polypropylene, polybutylene, and copolymers thereof, wherein all pbw are based on the total weight of the barrier layer (II).

11. The thermoformable composite of claim 10 wherein barrier layer (II) further comprises:

(iv) from 0 to 40 pbw of a homopolymer or copolymer of styrene.

12. The thermoformable composite of claim 10 wherein barrier layer (II) comprises:

(i) from 5 to 30 pbw of a polyethylene graft copolymer;

(ii) from 5 to 20 pbw of a block copolymer rubber; and (iii) from 30 to 70 pbw of a polyolefin selected from the group consisting of polyethylene, polypropylene, polybutylene, and copolymers thereof, and (iv) from 0 to 30 pbw of a homopolymer or copolymer of styrene; wherein all pbw are based on the total weight of the barrier layer.

13. The thermoformable composite of claim 1 wherein the polyethylene graft copolymer (i) of barrier layer (II) is a maleic anhydride modified high density polyethylene.

14. The thermoformable composite of claim 1 wherein block copolymer rubber (ii) of barrier layer (II) is selected from the group consisting of styrene-butadiene diblock; styrene-butylene-styrene triblock; styrene-ethylene/butylene-styrene triblock; styrene-ethylene/butylene-styrene triblock functionalized with maleic anhydride, maleic acid or admixtures thereof; and mixtures thereof.

15. The thermoformable composite of claim 1 wherein polyolefin (iii) of barrier layer (II) is a high density polyethylene having a density of between 0.940 and 0.970 and a melt index of 1.00 to 1.30.

16. The thermoformable composite of claim 1 wherein the homopolymer or copolymer of styrene (iv) of barrier layer (II) comprises high impact polystyrene.

* * * * *